(12) United States Patent
Fenner et al.

(10) Patent No.: US 6,290,759 B1
(45) Date of Patent: Sep. 18, 2001

(54) LINEAR ACTUATOR DRIVEN MOLECULAR SIEVE OXYGEN GENERATOR

(75) Inventors: Jerold E. Fenner, Hill AFB, UT (US); Nathan A. Dillon, San Antonio; John Ohlhausen, Castroville, both of TX (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/435,675

(22) Filed: Nov. 8, 1999

(51) Int. Cl.[7] ................................................. B01D 53/047
(52) U.S. Cl. ................................. 96/130; 96/114; 96/144
(58) Field of Search ......................... 95/130; 96/109, 96/110, 113, 114, 130, 143, 144

(56) References Cited

U.S. PATENT DOCUMENTS

| | | | |
|---|---|---|---|
| 3,236,028 | * 2/1966 | Rutan | 96/113 X |
| 4,169,715 | * 10/1979 | Eriksson | 96/114 |
| 4,207,084 | * 6/1980 | Gardner | 96/113 |
| 4,331,457 | * 5/1982 | Mörner | 96/130 X |
| 4,502,873 | * 3/1985 | Mottram et al. | 96/130 X |
| 4,636,226 | * 1/1987 | Canfora | 96/130 X |
| 4,948,401 | * 8/1990 | Izumi et al. | 96/130 X |
| 4,968,329 | * 11/1990 | Keefer | 96/130 X |
| 5,166,563 | * 11/1992 | Bassine | 95/130 X |
| 5,354,361 | * 10/1994 | Coffield | 96/130 X |
| 5,746,806 | * 5/1998 | Aylsworth et al. | 96/130 X |

* cited by examiner

*Primary Examiner*—Robert H. Spitzer
(74) *Attorney, Agent, or Firm*—Tony Y. Cole; Bobby D. Scearce; Thomas L. Kundert

(57) ABSTRACT

An apparatus for generating high purity oxygen is described which comprises a linear actuator, a dual acting air cylinder, two molecular sieve beds, and valving. The linear actuator drives the air cylinder back and forth, compressing air on both the forward and return stroke. On each stroke, fresh air is compressed into one of the beds, generating oxygen. Simultaneously, the opposite bed exhausts to ambient pressure and the non-compressing side of the cylinder draws in fresh air. The cylinder then reverses, which compresses air into the opposing bed and allows the first bed to exhaust.

5 Claims, 2 Drawing Sheets

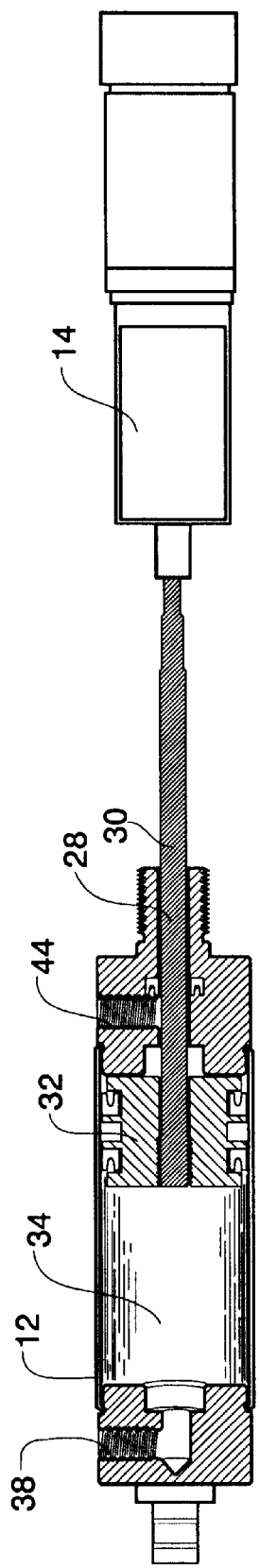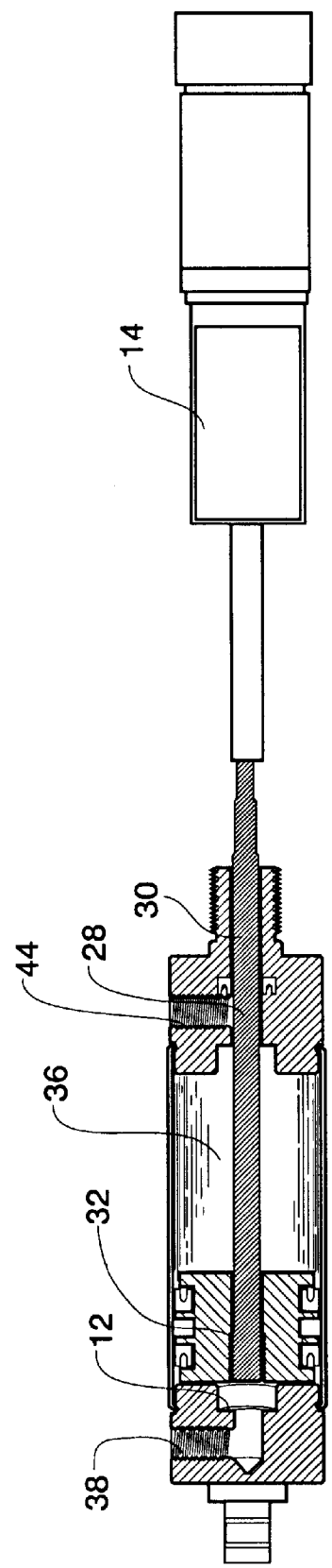

LINEAR ACTUATOR DRIVEN MOLECULAR SIEVE OXYGEN GENERATOR

RIGHTS OF THE GOVERNMENT

The invention described herein may be manufactured and used by or for the Government of the United States for all governmental purposes without the payment of any royalty.

BACKGROUND OF THE INVENTION

The present invention relates generally to oxygen generators and, more particularly, to a novel molecular sieve oxygen generator which produces oxygen from compressed air without using an external compressor.

Molecular sieve oxygen generation systems (MSOGS) require a source of compressed air in order to produce a supply of oxygen. These devices typically employ a cylindrical adsorbent bed containing a molecular sieve, which is an inert ceramic material designed to adsorb nitrogen more quickly than oxygen. In operation, a stream of compressed air (20–80 psig) is injected into the sieve bed. As pressure builds in the bed, nitrogen molecules attach themselves to the sieve while oxygen molecules pass through as the product gas. Eventually, sieve in the bed becomes saturated with nitrogen molecules and needs to be regenerated. This is done by venting the pressure in the sieve tank to the atmosphere. The nitrogen molecules previously attached to the sieve are released and within a few seconds the sieve bed is ready to begin accepting the feed air supply and producing oxygen again. The oxygen and air flows are controlled automatically by electrically operated solenoid valves. The pressurization/depressurization cycle does not degrade the sieve's adsorption capability. Therefore, the system can be run indefinitely to produce a steady stream of high purity (about 95%) oxygen.

A working system will often employ two such sieve beds and alternate them between pressurization and depressurization. In a typical two-step cycle, during step 1 of the cycle one bed receives high pressure feed air which pressurizes the bed and establishes a product oxygen flow. Simultaneously, the high pressure gas in the other bed is vented to the atmosphere, and this depressurization serves to desorb the nitrogen previously adsorbed during the high pressure phase of the cycle. Also, a portion of the product gas from the high pressure bed may be fed to the low pressure bed to flush the nitrogen-rich gas from that bed. In step 2 of the cycle the adsorbent beds exchange roles. This constant cycling results in a continuous product stream of high purity oxygen.

One conventional method for supplying the sieve beds with the pressurized source air is to use an external compressor. Air is drawn into the compressor, pressurized and then held in a storage tank. The MSOGS then runs off the compressed air from the tank. A limitation of such a system lies in the size and complexity of the various components. The external compressor is; usually large and heavy, and the tank can be bulky as well. These physical constraints can limit the transportability of the unit. Another method of supplying compressed air to MSOGS used on board aircraft is to utilize engine bleed air. This source of air is limited in quantity, can be filled with contaminants from the engines, is not available when the engine is shut down, and can sometimes be difficult to tap into.

It is therefore a principal object of the present invention to provide a molecular sieve oxygen generator which operates without an external compressed air source.

It is a further object of the invention to provide a compact, portable oxygen generator.

It is an advantage of the present invention that it provides a relatively simple apparatus for generating high purity oxygen.

Objects and advantages of the invention are set forth in part herein and in part will be obvious herefrom, or may be attained by means of instrumentalities and combinations pointed out in the appended claims.

SUMMARY OF THE INVENTION

In accordance with the foregoing principles and objects of the invention, an apparatus for generating high purity oxygen is described which comprises a linear actuator, a dual acting air cylinder, two molecular sieve beds, and valving. The air cylinder has a piston slidably mounted therein. The linear actuator retracts and extends the piston, compressing air on both the forward and return stroke. On each stroke, fresh air is compressed into the first bed, adsorbing nitrogen and providing a flow of oxygen. Simultaneously, the second bed exhausts to ambient pressure, desorbing nitrogen, while the non-compressing side of the cylinder draws in fresh air. The cylinder then reverses, which compresses air into the second bed and allows the first bed to exhaust. Valving controls oxygen and air flows. A continuous stream of oxygen is produced by the cyclical repeating of adsorption and desorption.

BRIEF DESCRIPTION OF THE DRAWINGS

The invention will be clearly understood from the following detailed description of preferred embodiments thereof read in conjunction with the accompanying drawing wherein

FIG. 2a illustrates a linear actuator coupled to an air cylinder of the invention, the air cylinder being illustrated in cross section to show a piston thereof in an extended position.

FIG. 2b illustrates a linear actuator coupled to an air cylinder of the invention, the air cylinder being illustrated in cross section to show the piston thereof in a retracted position.

DETAILED DESCRIPTION OF THE INVENTION

Figure 1:
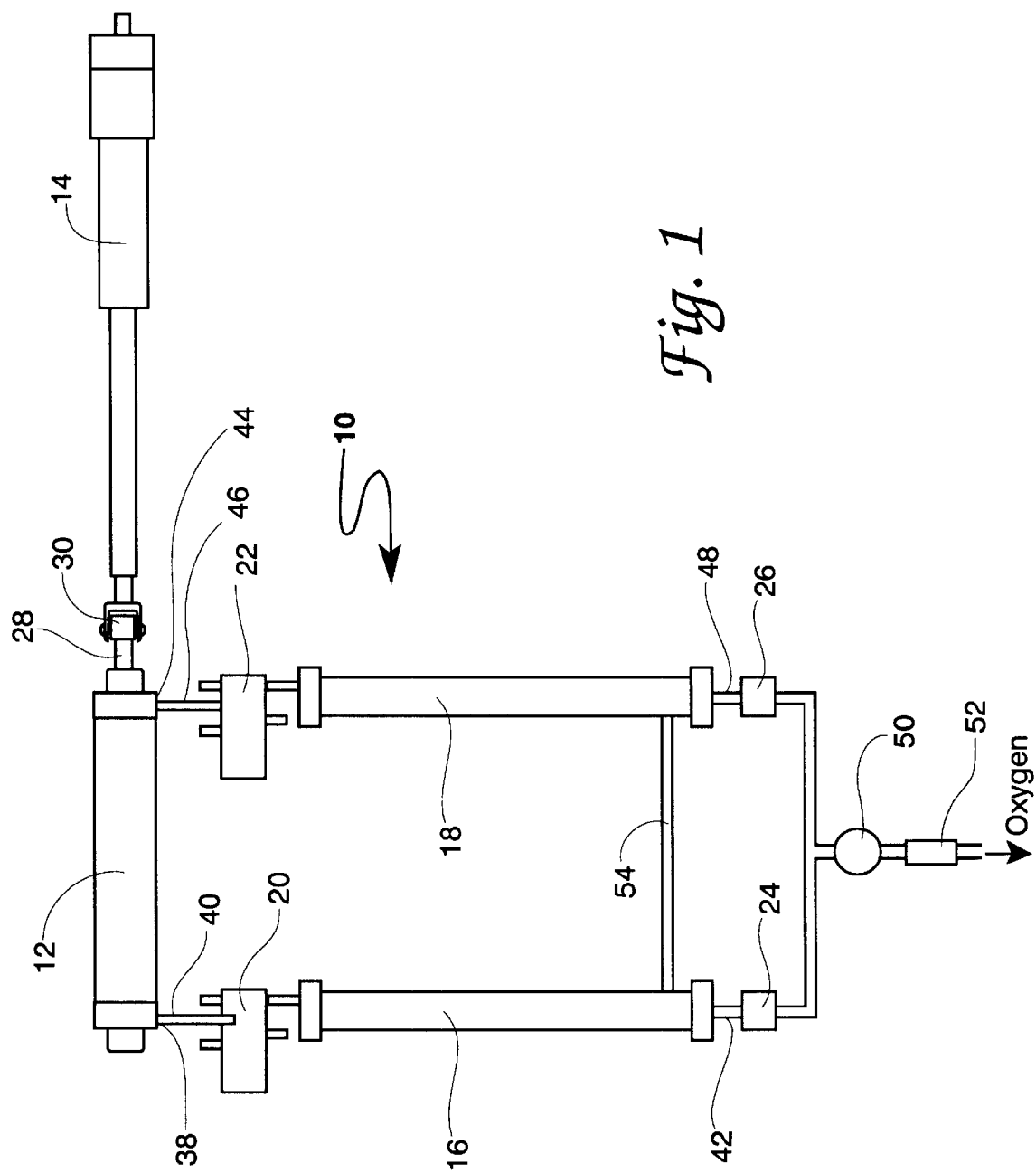
FIG. 1 is a schematic view of the essential components of a representative oxygen generator of the invention.

Referring now to FIG. 1, shown therein is a schematic view of the essential components of an oxygen generator 10 of the invention. The invention includes a dual acting air cylinder 12, a linear actuator 14, two molecular sieve beds 16, 18 and four valves 20, 22, 24, 26.

As illustrated in FIG. 2a, air cylinder 12 has a piston member 28 comprising an axial piston rod 30 coupled to a piston 32 which is slidably mounted in air cylinder 12. Preferably, the volume of air cylinder 12 is approximately three times larger than the combined sieve bed volumes. Preferably, air cylinder 12 is model 7012-DXP manufactured by Bimba Manufacturin, Company of Monee, Ill., and is provided with a 3 inch bore and 12 inch stroke.

As shown in FIG. 2, linear actuator 14 is coupled to piston rod 30 and operable to move piston 32 alternatively between retracted and extended positions within air cylinder 12. As illustrated in FIGS. 2a, 2b as piston 32 is retracted within cylinder 12, that is, moved from an extended position as illustrated in FIG. 2a to a retracted position as illustrated in FIG. 2b, air is compressed on a piston side 34 of air cylinder 12. As piston 32 is extended within cylinder 12, that is, moved from a retracted position as illustrated in FIG. 2b to an extended position as illustrated in FIG. 2a, air is compressed on a rod side 36 of air cylinder 12. Preferably, linear actuator 14 is an electrically powered unit, the speed and acceleration of which may be precisely controlled. A linear actuator found useful in the present invention consists of linear actuator model ACT2-B5-T1-N34-12, servo motor model 7ME175E, servo amplifier model MHB5020HX and motion controller MP3-202HR2, all from DYNACT, Inc. of Orchard Park, N.Y. It should be understood, however, that any device providing linear locomotion could be utilized to operate air cylinder 12, whether or not electrically powered.

As shown in FIG. 1, first and second molecular sieve beds 16, 18 are coupled to air cylinder 12, in a manner that will be further explained. Preferably, beds 16, 18 are stainless steel tubes with flanged ends. Beds 16, 18 are filled with a molecular sieve material, which preferentially adsorbs nitrogen while allowing oxygen and the other components of air, principally argon, to pass through. Such molecular sieves are well known in the art. Preferably, beds 16, 18 are filled with Oxysiv 5, a molecular sieve material which is manufactured by UOP, Inc. of Des Plaines, Ill.

As illustrated in FIG. 1, a first end of bed 16 is connected to a port 38 on piston side 34 of air cylinder 12 via air tubing 40. A first four-way valve 20 directs air flow between air cylinder 12, bed 16 and the atmosphere. A suitable four-way valve is model Mark IV available from Numatics, Inc of Highland, Mich. A second end of bed 16 is coupled via air tubing 42 to product gas collection means (not shown). A first two-way valve 24 controls the flow of the product gas out of bed 16. A suitable two-way valve is model IOS2CD8SG manufactured by Allenair Corp of Mincola, N.Y.

A first end of bed 18 is connected to a port 44 on rod side 36 of air cylinder 12 via air tubing 46. A second four-way valve 22 directs air flow between air cylinder 12, bed 18 and the atmosphere. A second end of bed 18 is coupled to product gas collection means (not shown) via air tubing 48. A second two-way valve 26 controls the flow of the product gas out of bed 18. A pressure regulator 50 and flow controller 52 maintain pressure within beds 16 and 18 in a manner well known in the art.

The operation of the above described embodiment will now be explained in detail by reference to FIG. 1. Oxygen generator 10 operates in recurring cycles. The operation of the system during each first and second half cycle of operation will be described.

In each first half cycle of operation, piston 32 is retracted within air cylinder 12 by actuator 14, thereby compressing air on piston side 34 of cylinder 12. Simultaneously, four-way valve 20 operates to direct pressurized air from piston side 34 of cylinder 12 to first bed 16 wherein nitrogen gas is adsorbed. At the same time, two-way valve 24 operates to permit the flow of oxygen gas from first bed 16. Four-way valve 22 simultaneously operates to allow ambient air to flow into rod side 36 of cylinder 12 and to depressurize second bed 18, thereby allowing previously adsorbed nitrogen gas to be desorbed. Thus, during each first half cycle, four-way valve 20 permits only the flow of compressed air from cylinder 12 to first bed 16, whereas four-way valve 22 permits only the flow of ambient air to cylinder 12 and the exhaustion of nitrogen gas from second bed 18. Two-way valve 26 remains closed during each first half cycle.

During the second half cycle of operation, previous actions are reversed. Thus, in each second half cycle of operation, piston 32 is extended within air cylinder 12 by actuator 14, thereby compressing air on rod side 36 of cylinder 12. Simultaneously, four-way valve 22 operates to direct pressurized air from rod side 36 of cylinder 12 to second bed 18 wherein nitrogen gas is adsorbed. At the same time, two-way valve 26 operates to permit product oxygen gas to be collected from second bed 18. Four-way valve 20 simultaneously operates to allow ambient air to flow into piston side 34 of cylinder 12 and to depressurize first bed 16, thereby allowing previously adsorbed nitrogen gas to be desorbed. Thus, during each second half cycle, four-way valve 22 permits only the flow of compressed air from cylinder 12 to second bed 18 whereas four-way valve 20 permits only the flow of ambient air to cylinder 12 and the exhaustion of nitrogen gas from first bed 16. Two-way valve 24 remains closed during each second half cycle.

By cyclically repeating the operation of adsorption and desorption, a continuous stream of oxygen from first and second beds 16 and 18 is thereby produced.

Because speed and acceleration of linear actuator 14 may be precisely controlled, the flow rate and pressure of the compressed air entering beds 16, 18 may also be carefully controlled. Slowing down this initial pressure wave may improve performance of the system by giving the molecular sieve more time to adsorb nitrogen.

As illustrated in FIG. 1, oxygen generator 10 may also include purge means for regeneration of beds 16, 18 during the depressurization phases of the cycle. Preferably, purge means consist of a purging tube 54, which connects beds 16 and 18 and which is used to feed a portion of the product oxygen gas from the high-pressure bed to the low pressure bed in order to flush out excess nitrogen in preparation for the next high pressure cycle. Such purging improves the efficiency of MSOGS devices in a manner that is well known in the art.

Because the oxygen generator of the present invention uses a dual acting air cylinder to inject compressed air into the sieve beds, the present requirement for bulky storage tanks or an external compressor is eliminated. Air is compressed only as needed. The embodiment described herein requires only electrical power to operate and may be packaged into a compact, transportable unit capable of generating a steady stream of 95% oxygen. Inventors' apparatus may be used by pilots and aircrew operating in high altitude or high gravity environments to help prevent hypoxia. The invention may also be used for medical purposes in field hospitals or for home therapeutic purposes.

The invention therefore provides a novel molecular sieve oxygen generator which produces high purity oxygen without an external compressed air source. It is understood that modifications to the invention may be made as might occur to one with skill in the field of the invention within the scope of the appended claims All embodiments contemplated thereunder which achieve the objects of the invention have therefore not been shown in complete detail. Other embodiments may be developed without departing from the spirit of the invention or from the scope of the appended claims.

We claim:

1. An apparatus for producing oxygen, comprising:
   (a) a dual acting air cylinder having a piston member comprising an axial piston rod coupled to a piston slidably mounted in said cylinder;
   (b) an actuator coupled to said rod for retracting and extending said piston in said cylinders thereby alternately compressing air on a piston side and a rod side of said cylinder;
   (c) first and second beds containing molecular sieve coupled to said cylinder; and (d) valving coupled to said cylinder and to said first and second beds, said valving being operable in recurring cycles in which said piston member is retracted and extended;

so that in each first half cycle of operation in which said piston is being retracted, ambient air flows into said rod side of said cylinder, pressurized air is simultaneously directed from said piston side of said cylinder to said first bed to adsorb nitrogen and provide a flow of oxygen gas from said first bed, and said second bed is simultaneously depressurized and previously adsorbed nitrogen gas is desorbed and exhausted from said second bed;

and in each second half cycle of operation in which said piston is being extended, ambient air flows into said piston side of said cylinder, pressurized air is simultaneously directed from said rod side of said cylinder to said second bed to adsorb nitrogen and provide a flow of oxygen gas from said second bed, and said first bed is simultaneously depressurized and previously adsorbed nitrogen gas is desorbed and exhausted from said first bed;

whereby by cyclically repeating said operation in which said piston member is retracted and extended, a continuous stream of oxygen is produced.

2. An apparatus as set forth in claim 1 wherein said valving comprises a first set of valves coupled between said cylinder and said first and second beds to control air flow to and from said cylinder and nitrogen exhaust flow from said first and second beds and a second set of valves coupled to said first and second beds to control oxygen flow from said first and second beds.

3. An apparatus as set forth in claim 2 wherein said first set of valves comprises first and second four way valves, said first four way valve being operable to permit only the flow of compressed air from said piston side of said cylinder to said first bed during each said first half cycle of operation and to permit only the flow of ambient air to said rod side of said cylinder and the exhaustion of nitrogen gas from said second bed during each said second half cycle of operation, and said second four way valve being operable to permit only the flow of ambient air to said piston side of said cylinder and the exhaustion of nitrogen gas from said first bed during each said first half cycle of operation and to permit only the flow of compressed air from said rod side of said cylinder to said second bed during each said second half cycle of operation.

4. An apparatus as set forth in claim 2 wherein said second set of valves comprises first and second two way valves, said first two way valve being operable to permit the flow of oxygen gas from said first bed only during each said first half cycle of operation and said second two way valve being operable to permit the flow of oxygen gas from said second bed only during each second half cycle of operation.

5. An apparatus as set forth in claim 1 further comprising purge means for regeneration of said first and second beds during depressurization of said first and second beds.

* * * * *